United States Patent [19]
Fontana et al.

[11] Patent Number: 5,497,265
[45] Date of Patent: Mar. 5, 1996

[54] HIGH-POWER SIGNALS OPTICAL GENERATOR FOR TELECOMMUNICATION SYSTEMS

[75] Inventors: Flavio Fontana, Cormano; Aldo Righetti, Milan; Giorgio Grasso, Monza, all of Italy

[73] Assignee: Pirelli Cavi S.p.A., Italy

[21] Appl. No.: 162,651

[22] Filed: Dec. 6, 1993

[30] Foreign Application Priority Data

Dec. 23, 1992 [IT] Italy .................... MI92A2932

[51] Int. Cl.⁶ .................................................. H04B 10/00
[52] U.S. Cl. .............................................. 359/341; 359/160
[58] Field of Search .................................. 359/160, 188, 359/341, 345

[56] References Cited

U.S. PATENT DOCUMENTS

| | | | |
|---|---|---|---|
| 5,287,212 | 2/1994 | Cox et al. | 359/160 X |
| 5,315,426 | 5/1994 | Aoki | 359/160 X |
| 5,369,524 | 11/1994 | Pocholle et al. | 359/160 X |

FOREIGN PATENT DOCUMENTS 0387075  3/1990  European Pat. Off. .......... H01S 3/06

OTHER PUBLICATIONS

Proceedings ECOC 91, 9–12 Sep. 1991, Paris, pp. 149–152 Grasso et al.
Proceedings ECOC 91, Invited Papers, 9–12, Sep., Paris pp. 87–96 Y. Park et al.
IEEE Photonics Technology Letters vol. 2, No. 8, Aug. 1990, New York US pp. 562–564, XP000149727 J. B. Schlager et al.

*Primary Examiner*—Mark Hellner
*Attorney, Agent, or Firm*—Brooks Haidt Haffner & Delahunty

[57] ABSTRACT

An optical signal generator for telecommunication systems, comprising at least a single-frequency active optical fiber laser as an optical signal source at a signal transmission wavelength, at least an active optical fiber optical amplifier operatively connected to said laser and at least one source of pumping optical power at a pumping wavelength, the pumping optical power source being operatively connected to at least one of said active fibers of said laser and amplifier and transfer-means for said pumping optical power being connected to said active fibers of said laser and amplifier, in order to transfer unabsorbed optical power at the pumping wavelength from one of said active fibers to the other of said active fibers.

14 Claims, 2 Drawing Sheets

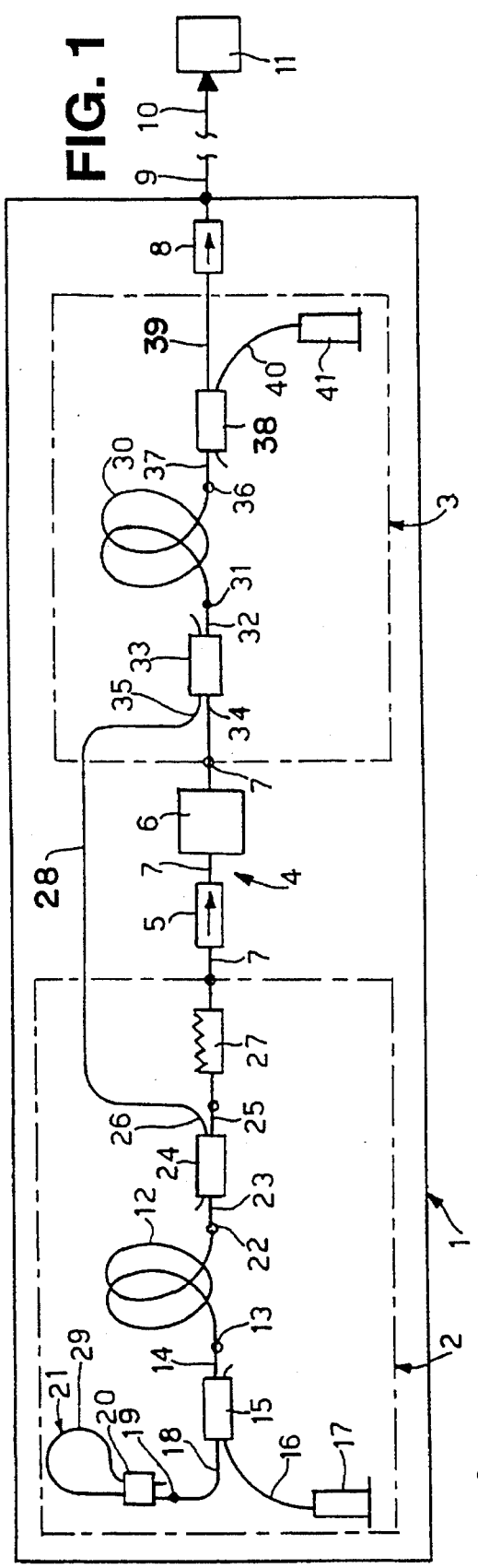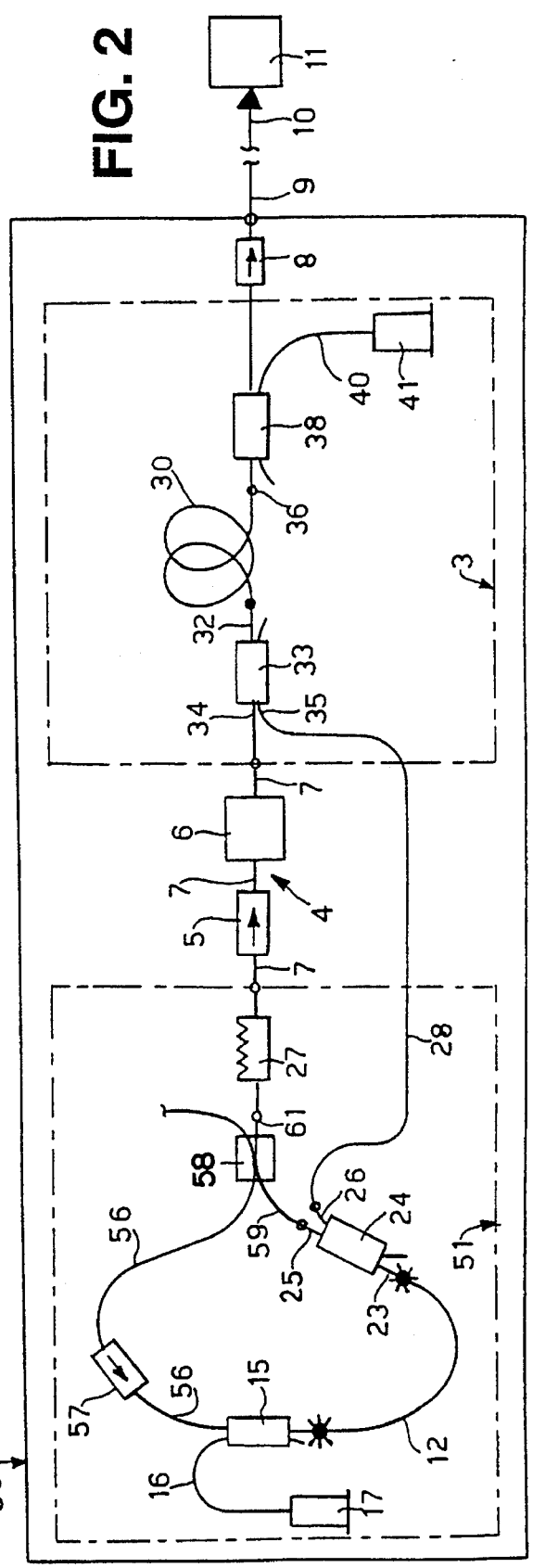

HIGH-POWER SIGNALS OPTICAL GENERATOR FOR TELECOMMUNICATION SYSTEMS

BACKGROUND OF THE INVENTION

1. Field of the Invention

The present invention relates to a high-power optical signal generator including at least a laser as the signal source and at least an optical amplifier operatively connected to the laser. The invention is particularly suitable for telecommunication equipment, such as cable television. (CATV) and signal distribution networks.

2. Background and Objects of the Invention

At present, high-power and high-speed transmissions are limited by the maximum power of single-frequency semiconductor lasers of the DFB (distributed feed-back) type used as signal sources. In particular, it is difficult to realize semiconductor lasers which have an output above 2–4 mW and which are reliable. Furthermore, if bias current is commutated or modulated at a high modulation speed in such lasers, the fast current changes cause a change in the frequency of the light emitted by the device. When the signal then propagates in a dispersive means (such as an optical fiber), these frequency changes turn into propagation time variations and the quality of the received signal is degraded.

If the laser operates with continuous wave (CW) and an external width modulator is positioned downstream, however, the frequency noise problem is eliminated. Nevertheless, the width modulator, generally an integrated optics passive device, causes an additional loss due to the coupling losses which take place owing to light transition from an optical fiber to a wave guide of the modulator and vice versa.

These losses involve a power penalization of 3–4 dB, further reducing the available optical power.

The use of an amplifier placed downstream of the modulator in order to increase output power to 20–40 mW is described in PROCEEDINGS ECOC '91, (Post-Deadline Paper), pages 72–75, from P.M. Gabla et al.

In this document an experiment is described using a DFB laser transmitter connected to a Mach-Zender external modulator and an erbium-doped optical fiber postamplifier (EDFA) in order to raise the signal level up to +12 dBm. However, the transmission path of the described device goes through 26 sections, each one including one erbium doped optical fiber amplifier (EDFA) and one fiber coil.

Also, the DFB laser used in the experiment had emission at a wavelength of 1553 nm, while the maximum absorption of the amplifier fiber was at a wavelength of 1533 nm.

Furthermore, in OFC '92, pages 242, 243 (Y.K. Park et al.) a long distance transmission experiment is described in which a DFB laser at 1558 nm wavelength emission was connected to a Mach-Zender external modulator and then to a power amplifier. The described device had a series of two connected erbium doped optical fiber amplifiers (EDFA), each one of them with bidirectional pumping.

In order to obtain the better performances of the amplification stage connected to the laser, and of the line amplifiers, the emission wavelength of the continuous wave laser must be fitted as much as possible to the gain peak wavelength of the amplifier, which, if carried out in a fiber made of silica doped with erbium, has wavelength values of about 1531 or 1536 nm, which is related to the dopant, e.g., germanium or alumina, which is used to modify the refraction index of the fiber core.

In order to satisfy this requirement, it is necessary to use a DBF laser at a selected wavelength but this involves, among other things, manufacturing difficulties and a significant increase in cost.

The known structure also has drawbacks, due, among other things, to the requirement of limiting the noise generated by the amplifier, which is particularly critical for some applications and which requires the maintenance of a high pumping power level along the whole fiber. This condition requires, on the one hand, feeding high pumping power to the fiber, thus reducing the amplifier efficiency, and on the other hand, having high power pumping lasers which have a reduced reliability.

In order to supply such high pumping power, pumping splitting and multi-stage amplifications may also be required, which makes the structure more complex and affects the whole efficiency: for instance, Y. Park et al. in OFC '92 describe the use, as a power amplification unit, of two fiber amplifiers, each of them pumped with two pumping lasers having powers respectively of 15.3 dBm and of 17.3 dBm, for an output power of 16 dBm.

There are also known laser fibers, doped with erbium, as described in PROCEEDINGS ECOC '91, pages 149–152 by G. Grasso et al. Such lasers, nevertheless, require the use of a diode pumping laser, which is commercially available with emission powers which are not optimal for fiber laser operation, so that the fiber laser has limited efficiency, particularly for the aforesaid uses in telecommunications.

It has been found that the combination of a fiber laser and a fiber amplifier, in which the pumping power is shared between the laser and the amplifier, allows the achievement of high efficiency and low noise generation, overcoming the typical limits of the known solutions and of the single components.

An object of the present invention is, therefore, to provide a high power optical signal generator, particularly for telecommunications use, which has high efficiency, reliability and low cost.

SUMMARY OF THE INVENTION

Accordingly, the invention relates to an optical signal generator comprising a continuous wave, coherent, optical signal source and an optical amplifier, operatively connected to said source for the amplification of the optical signals, wherein:

said source is constituted by an optical fiber laser oscillator, comprising an active fiber having core doped with a selected fluorescent substance having laser emission at an emission wavelength and light absorption at a pumping wavelength different from said emission wavelength; said amplifier comprising an active optical fibre having core doped with a selected fluorescent substance having emission at said emission wavelength and light absorption at said pumping wavelength; and a pumping optical power supply means at said pumping wavelength.

characterized in that:

said pumping optical power supply means is operatively connected to at least one of said active fibers of said laser oscillator and said amplifier; and a selective transfer means for said pumping optical power is operatively connected to said active fibers of said laser oscillator and said amplifier, in order to transfer non-absorbed optical power at the pumping wavelength from one of said active fibers to the other of said active fibers.

According to a preferred embodiment, said transfer means comprises selective dichroic couplers between said emission wavelength and said pumping wavelength, said couplers having three optical input/output branches, including:

a first branch, which jointly carries optical signals at the emission wavelength and at the pumping wavelength, is respectively connected to an end of said active optical fiber of said laser oscillator and of said active fiber of said amplifier;

a second branch, which carries optical signals at the emission wavelength, is operatively connected to conduct between the input and output of said second branch; and a third branch, which carries optical signals at that pumping wavelength, is connected between the first and second branches through a by-pass optical conduction means and said active fiber amplifier for the luminous emission transfer at said pumping wavelength between said laser oscillator and amplifier.

Advantageously, said active fibers of said laser and amplifier have core doped with at least a same fluorescent substance, namely erbium.

BRIEF DESCRIPTION OF THE DRAWINGS

Features and advantages of the invention will be now illustrated with reference to preferred embodiments, represented by way of non-limiting examples, in the accompanying drawings, wherein:

FIG. 1 is a schematic representation of a first embodiment of an optical signal generator;

FIG. 2 is a schematic representation of a second embodiment of an optical signal generator;

DESCRIPTION OF THE PREFERRED EMBODIMENTS

Figure 3:
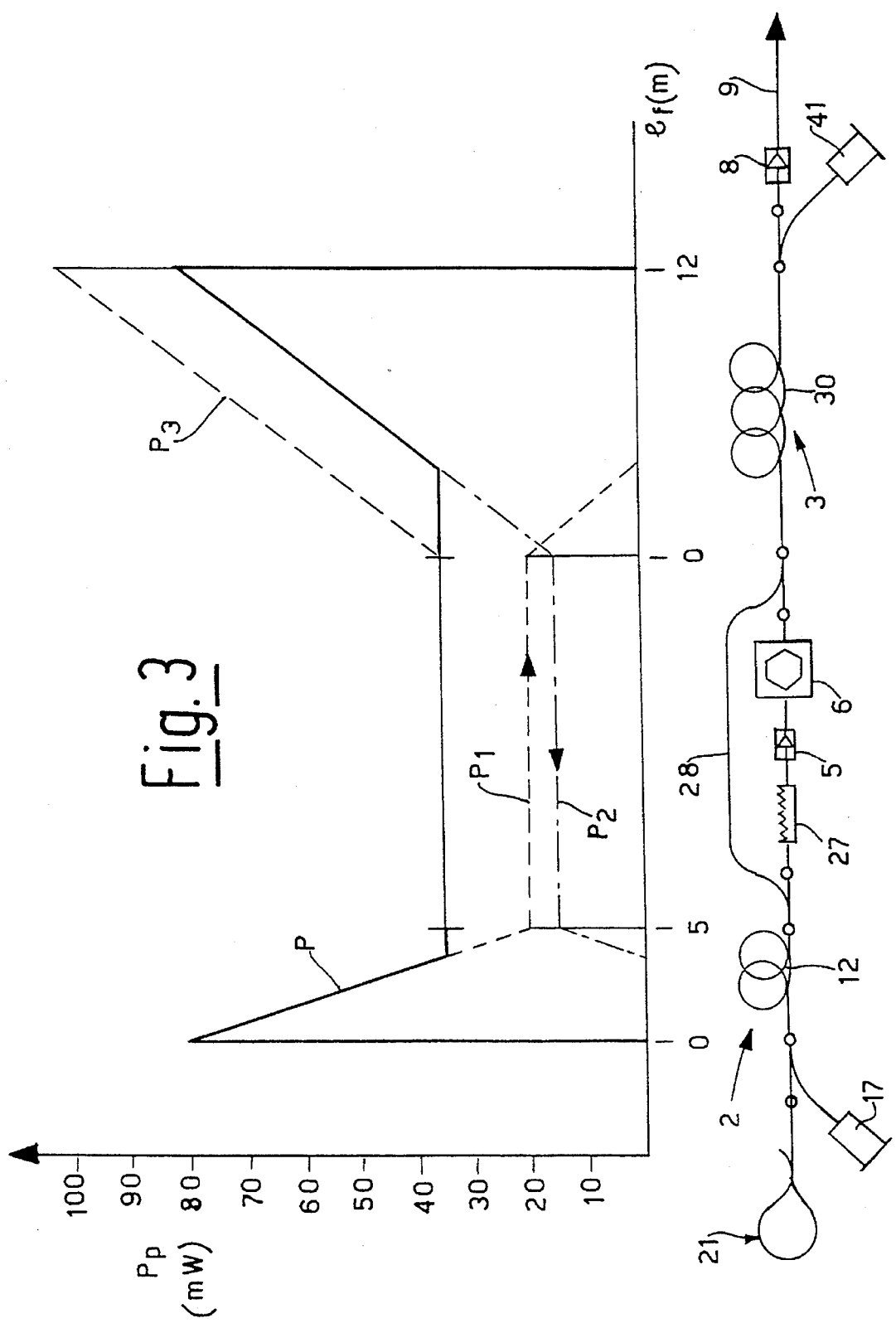
FIG. 3 is a combined schematic representation of the generator of the invention and the variation of partial and total pumping powers along the optical signal generator.

FIG. 1 illustrates a high power signal optical generator 1 including a single-frequency continuous wave (CW) laser oscillator 2, which constitutes an optical signal source at emission wavelength, and an amplifier 3.

Reference numeral 4 designates a connection line between said generator 1 and said amplifier 3 and includes an optical fiber 7, an optical isolator 5 and a width modulator 6 of the generator signals, for example, a Mach-Zender modulator.

An optical isolator 8 disposed downstream of the amplifier 3 and an optical output fiber 9 from the generator 1, connect, through an optical fiber 10, to a receiver 11 of the output signals from generator 1.

The laser generator 2 active means is constituted by an active optical fiber 12 including a refraction index modifier, preferably, alumina, germanium or alumina and germanium, and having core doped with at least a selected, fluorescent substance, preferably, erbium.

The active fiber 12 has an upstream end 13 connected to an output 14 of a dichroic coupler 15 having an input 16 connected to a pump laser 17, able to supply pumping power at pumping wavelength. An input 18 of said coupler 15 is connected to an output 19 of a directional coupler 20, which is connected to the ends of a wide-band reflector 21, which, in the described embodiment, is a reflection ring 29 able to reflect the whole emission spectrum of the active fiber 12, or at least its part of interest for the transmission.

In another version, the wide-band reflector 21 could be a metal coating (plating) of the terminal surface of the fiber 12, or even by a wide-band Bragg grating reflector.

The active fiber 12 has a downstream end 22 connected to an input 23 of a dichronic coupler, or multiplexer, 24 with three optical input/output branches, the output 25 of which is connected to a narrow-band, selective reflector 27, able to reflect a band of a width which is less than 0.5 nm and preferably, less than 0.1 nm of the active fiber 12 emission spectrum, and which is, preferably, a Bragg grating optical fiber reflector, or a Fabry-Perot interferometer with "GRIN" lens (abbreviation for "graded index", or gradually variable refraction index), acting as a narrow-band reflector. The reflector 27 is connected to the line 4, an output 26 of the coupler 24 is connected to a branching off fiber 28, at the pumping wave-length, a longitudinal single-mode (monomodal) "by-pass" fiber, in parallel to said connection line 4.

A fiber laser using a grating reflector is, for example, described in "Electronics Letters", vol. 24, Nr. 1, 7 Jan. 1988.

A fiber laser operating at longitudinal single-mode, by means of a Fabry-Perot interferometer with "GRIN" lens is described in "PROCEEDINGS ECOC 1991", pages 149–152.

A Fabry-Perot interferometer is commercially available. The structure of an interferometer with GRIN lens, known in itself, is described in particular in the aforesaid article.

The Bragg grating reflector is constituted by an optical fiber whose cladding and core are partly removed for a length, forming a surface on which, by means of a photochemical process, several parallel lines are realized having pitch $\Lambda$ which is related to the reflected wavelength by the relation $l=2 n_e \Lambda$, wherein $n_e$ is the effective mode refraction index of said fiber. Therefore, the grating pitch is related to the emission bandwidth of the laser 2.

The Bragg reflector features are not further described in detail because it is known and commercially available.

The amplifier 3 comprises an optical active fiber 30, including a refraction index modifier, preferably, constituted by alumina, germanium or alumina and germanium, and having core doped with at least a selected fluorescent substance, also preferably, erbium.

Preferably, the amplifier active fiber is a fiber having the same features as the laser oscillator active fiber. In particular, it is favorable that the fluorescent dopant and the one or more index modifier dopants are the same, or are anyway chosen so that the laser emission spectrum is as much as possible equal to that of the amplifier (within the band of considered wavelengths), so as to have the laser emission at the wavelength of maximum gain for the amplifier, thus obtaining the best system efficiency.

The active fiber 30 has an upstream end 31 connected to an output 32 of a dichroic coupler, or multiplexer, 33, the inputs of which, 34 and 35, are respectively connected to the line 4 and to the by-pass fiber 28.

A downstream end 36 of the active fiber 30 is connected to an input 37 of a dichroic coupler 38, the outputs of which, 39 and 40, are respectively connected to said optical isolator 8 and to a pump laser 41, able to supply pumping power at the aforesaid pumping wavelength, supplying the active fiber 30 from its downstream end, counter-current with respect to the direction of the path of the optical signal within the amplifier 3.

The optical general 1 works as follows:

The active fiber 12 of the laser 1 receives pumping energy at the pumping wavelength, which is therein absorbed giving rise to a laser transition with light emission at the emission wavelength, which is amplified in consequence of reflections due to reflectors placed at the ends of the fiber itself, giving rise to a coherent light emission. Such emission is sent through the optical isolator 5, to the modulator 6 and then, to the amplifier 3.

The modular 6 converts the continuous emission of the laser 2 into a modulated optical signal.

The amplifier 3, the active fiber of which is maintained in a population inversion state (namely, excited at a laser emission level) by the pumping power therein absorbed, amplifies the signal, up to a power level which is enough to be fed into the output optical fiber 9 and to reach the receiver 11 through the fiber 10 maintaining a power level which is large enough to be useful, even after the attenuation introduced by the fiber 10 itself, which in the practical application may have a considerable length, for example dozens or hundreds of kilometers. The pump laser 17 of the laser oscillator 2 is selected to generate optical power in excess of that absorbed by the active fiber 12 for reasons which will be hereafter illustrated. The unabsorbed residual optical pump power at the end 22 of the fiber 12 itself is transferred to the active fiber 30 of the amplifier 3 by means of the couplers 24, 33 and the by-pass fiber 28.

Similarly, the pump laser 41 of the amplifier 3 is selected to generate optical power in excess of that absorbed by the active fiber 12. The residual excess of pumping power at the end 31 of the active fiber 30 of the amplifier 3 is transferred to the active fiber 12 through the same couplers 24, 33 and the same by-pass fiber 28.

In accordance with the invention, an optical generator according to the illustration in FIG. 1., has been made and had the following features.

Laser 2 in the described example had an active fiber 12 having core doped with erbium and has the following features:

| fiber length | 5 m |
|---|---|
| fiber type | Si/Al |
| numerical aperture | NA = 0.19 |
| cut off wavelength | $l_c$ = 900 nm |
| erbium content in the core | Nt = 5.8 × 10$^{24}$ ions/m$^3$ |
| pumping section | sp = 2.8 × 10$^{-25}$ m$^2$ |

The pump lasers 17 and 41 were lasers of a type known as "Strained Quantum Well" with the following features:

| emission wavelength | $l_p$ = 980 nm |
|---|---|
| output power | Pu = 80 mW |

Lasers of the specified type are, for instance, produced by David Sarnoff Research Center, Washington Rd., Princeton, N.J. (USA).

The reflection ring 21 was formed with about 50 cm of monomodal optical fiber at the signal wavelength.

The directional coupler 20 has power division ratio of 50/50 and is of commercial kind, as, for instance, model 1550 POH 50/50 2×2 produced by Gould Inc., Fiber Optic Division, Baymeadow Drive, Glem Burnie, Md. (USA).

Dichroic couplers 15 and 24 which were used, were melted fiber couplers consisting of two monomodal fibers at 980 nm and 1531 nm wavelength, with variation of output optical power as a function of the polarization, lower than 0.2 dB, so as to avoid emission instability, in the presence of thermal variations or mechanical stresses which cause a variation in the emission polarization of the pump laser 17.

Dichroic couplers of the indicated kind are produced, for instance, by Gould Inc., Fiber Optic Division, Baymeadow Drive, Glem Burnie, Md. (USA), and by Sifam Ltd., Fibre Optic Division, Woodland Road, Torquay, Devon (GB).

The output fiber 25 of the coupler 24 is traversed by light at 1531 nm wavelength, while the by-pass fiber 28 is traversed by light at 980 nm wavelength.

The Bragg grating selective reflector 27 used had the following features:

| reflectivity | 35% |
|---|---|
| reflected bandwidth | l = 1531 nm |
| band width | 0.7 nm |

Reflectors of this kind are marketed by United-Technologies Photonics, Silver Lane, East Hartford, USA.

The modulator 6 is an intensity modulator based on a wave guide version of a Mach-Zender interferometer, of a commercial kind, with a band width in linear field of 3 GHz, with minimal extinction ratio of 22 dB and suitable for working within the wavelength band of 1530–1550 nm. The modulator used was model MZ315P produced by Crystal Technology, Inc., 1060 East Meadow Circle, Palo Alto, Calif., USA.

The active fibers 30 of the amplifier 3 with the core doped with erbium had the following features:

| fiber length | 12 m |
|---|---|
| fiber kind | Si/Al |
| numerical aperture | NA = 0,19 |
| cut off wavelength | $l_c$ = 900 nm |
| erbium content in the core | Nt = 5.8 × 10$^{24}$ ions/m$^3$ |
| pumping section | sp = 2.8 × 10$^{-25}$ m$^2$.ls1 |

The described generator had the following features:

| total pumping optical power | 160 mW |
|---|---|
| laser pumping optical power | 80 mW |
| amplifier pumping optical power | 80 mW |
| residual pumping power in the laser | 20 mW |
| residual pumping power in the amplifier | 15 mW |
| signal power at the laser output | 3 mW (5 dBm) |
| signal power after modulation | about 1 mW (0 dBm) |
| signal power after amplification | 45 mW (16 dBm) |

The laser 2 illustrated in FIG. 1 is provided with a steady wave resonant cavity, but other cavity architectures may be used. For instance, a ring cavity incorporating a reflection grid, as in the optical generator of FIG. 2.

In the version of the optical generator shown in FIG. 2, the elements common with those of FIG. 1 are indicated with the same reference numbers. The optical signal generator 50, includes a single-frequency continuous wave laser 51 and an amplifier 3.

The laser 51 is constituted by an active fiber 12, for instance, of the same kind as the fiber in FIG. 1, by a dichroic coupler 15 connected through an optical fiber 16 to a pumping laser 17, and by a reflecting optical fiber 56 provided with an optical isolator 57. The reflecting fiber 56 is connected to a directional coupler 58 to which is connected an optical fiber 59 which, in turn, is connected to a dichroic coupler 24. The coupler 24 is connected to the active fiber 12 and to the by-pass optical fiber 28. An output 61 of the directional coupler 58 is connected to the selective grid reflector 27.

In the FIG. 2 embodiment, the light emission at 1531 nm generated by the fiber laser 51 propagates through the optical isolator 5 and the width modulator 6, entering the fiber amplifier 3, pumped by way of a coupler 33, and is then transmitted to the receiver 11, as in the optical generator 1 of FIG. 1.

Likewise, the excessive pump power of one or of the other pump laser 17, 41 is transferred either to the active fiber 30 or to the active fiber 12.

The directional coupler 58 has a division ratio of 50/50 and shares, with this ratio, between the fibers 56 and 59, the light beam power reflected by the selective reflector 27.

In the aforedescribed optical generators 1 and 50, the laser resonant cavity is delimited by the ring of the reflection fiber 21 or by the reflection fiber 56 (or by another wide band equivalent mirror) acting as high laser reflector, and by a grid reflector 27 acting as an output coupler with an extremely narrow reflection band.

The pumping energy generated by the pump laser 17 is fed through the respective coupler 15 to the erbium doped fiber 12, which constitutes the active means of the laser source.

Within the laser cavity is present a dichroic coupler 24 able to convey to the active fiber 12, the pump energy coming from the amplification stage 3 through the pump by-pass 28.

The single-frequency laser 2 or 51 with erbium doped active fiber 12 is connected with an amplification stage 3 with an ermium doped active fiber 30. The fiber laser emission coincides with the gain peak of the amplifier fiber. This assures the most efficient amplification of the light produced by the fiber laser.

The laser single-frequency operation is obtained with the use of the grid reflector 27 with narrow-width band, typically less than or equal to 0.1 nm, using the spectral selectivity of the periodical structure of the reflector grid and the mode competition due to the different reflection efficiency at the different frequencies within the reflector reflection band, which penalizes the wavelength modes different from that of maximum reflection within the band, and which are subjected to higher losses and do not reach the laser operating threshold.

A laser of this kind is described, for instance, in the aforesaid article "Electronics Letters", pages 24–26, vol. 24, N. 1, 7 Jan. 1988.

The presence of residual pumping power at the end of the laser 2 active fiber and of the amplifier 3 is related to the particular kind of fluorescent dopant therein used, preferably, erbium.

In fact erbium, present as a dopant in the fiber core in the form of $Er^{3+}$ ions, forms a so-called "three levels" emission system, wherein the pumping energy fed in the fiber is absorbed and excites $Er^{3+}$ ions from the base level to an energy band, a so-called "pumping band", from where they fall, in not a radiative way, to an excited level, a so-called "higher laser level", where they can rest for a certain time before spontaneously falling again to the base level.

The photon passage at the same wavelength corresponding to said laser level causes a transition of the erbium ion to the base level, followed by the emission of a new photon, coherent with the first and having the same wavelength.

Such phenomenon allows the generation of a signal due to spontaneous emission and its coherent amplification, caused by multiple reflections in a laser oscillator, like the laser 2, and the amplification of an output signal which is fed to the fiber amplifier 3.

In the presence of erbium ions at a base level, on the contrary, a photon at the wavelength corresponding to the aforesaid laser emission level is absorbed, exciting a corresponding erbium ion at the laser level, and hence, causing a signal attenuation.

Therefore, in order to have a signal emission or amplification, it is necessary that along the whole active fiber length, the pumping power is higher than a certain level, or "threshold level", at which erbium ions at the higher laser level are of the same number than the ones at the base level, so that the amplification effect due to erbium ions excited at laser level compensates the attenuation effect due to erbium ions at base level, in this way realizing the so-called fiber "transparency".

In an active fiber, the threshold power value depends on the dopant (erbium) content therein. By way of example, in the active fiber of the example of FIG. 1, the threshold power is 5 mW.

For various reasons, in addition, it is preferable to maintain even at the active fiber end, opposite to that of pumping energy input, a residual pump power value not only equal, but even higher by a certain value than the aforesaid threshold value. In this way, at the end of the active fiber opposite from the pump power input end, there still remains an amount of pumping optical power, at least equal to the aforesaid "threshold" value.

The need to maintain a high pump power level even at the extreme end section of the active fiber is particularly important in the amplifier, wherein it has been observed that the "noise" due to the same amplifier rises considerably when pumping power has a minimum value in the fiber close to the "threshold" power, with respect to a situation in which the minimum value of the pumping power in the fiber is enough greater than the "threshold" power.

The "noise" is in fact proportional to the atomic population in the higher laser level and decreases less rapidly than the gain along the fiber with the pumping power decreasing within the fiber itself.

FIG. 3 shows the variation of the pumping power $P_p$ supplied in the respective active fibers 12 and 30 of the laser and of the amplifier, as a function of the length $l_f$ of the fibers themselves. The broken line $P_1$ indicates the pump power due only to the pump laser 17, and the dotted line $P_2$ indicates the pump power due only to the pump laser 41.

The continuous line P shows the whole pump power in the fibers, due to the contribution of both the pump lasers.

As shown by the previously related experimental data, without "by-pass", the pump power supplied by the pump laser 17, not absorbed by the doped fiber 12 and present at its end 22, has a considerable magnitude, equal to 20 mW in the example given. In the amplifier, in its turn, the residual pumping power at the end 31 of the fiber 30 has a value equal to about 15 mW.

In the amplifier, especially, such residual power level would be excessively low, such as to cause an unacceptable high noise level in the emitted signal. A minimal acceptable value of residual pump power in the amplifier fiber is higher than 25–30 mW.

With 15 mW of residual minimum pump power in the amplifier fiber, one can estimate a noise figure, defined as $(S/N)_i/(S/N)_o$, higher than 4.8 dB where $(S/N)_i$ is the ratio between the signal power and the noise power at input in the amplifier and $(S/N)_o$ is the ratio between the signal power and the noise power at output from the amplifier.

Therefore, the residual pump power transfer from the one to the other of the active fibers allows as is shown by FIG. 3 (which schematically represents the phenomenon) to retain, particularly in the amplifier 3, a pump power level never less than 35 mW, which provides particularly low noise values. In the described experiment, a noise figure equal to about 3.8 dB was obtained.

Such performance, without pump power transfer, would require much higher power values of the laser 41, for example, about 100 mW, as shown in FIG. 3 by broken line $P_3$, which can be obtained with a laser much more expensive and less reliable due to the high power required.

The structure according to the invention, in addition, prevents any dissipation of residual pump power, which has not been absorbed in the active fiber of the laser 2, for which it would not be practical to use a pump laser of an excessively low power which would be suitable only for the requirements of the laser 2 itself.

Modulator 6, which as it has been said, is preferably a Mach-Zender modulator, in $LiNbO_3$, is placed upstream of the amplifier 3, in order to avoid "photorefractive" damaging risks of the wave guide of said modulator, due to the high power involved (more than 10 mW), that would arise if it were disposed to modulate an already amplified signal. High optical signal powers may generate the formation of coupled electron-holes in the wave guide structure, which would change the light propagation.

In the example illustrated, the generator 1 includes the pump lasers 17 and 41, but a generator according to the invention may be equipped either only with the pump laser 17 or only with the pump laser 41, because the by-pass optical fiber 28 allows the transfer of the excess pump power, in the first case, to the active fiber 30 of the amplifier 3, and in the second case, to the active fiber 12 of the laser 2.

Preferably, there are used two equal pump lasers, thereby to obtain higher reliability of the unit, because of the more limited power required from each of them, avoiding the use of high power lasers, that is, it is preferable to resort to use multi-stage or multi-pump structures, without, with this, affecting the system performance.

The pump signal by-pass 28 solution allows a drastic simplification of the architecture of the optical generator, optimizing the use of the available pump power.

In the aforedescribed experimental examples, the amplifier 3 is pumped by a source of pump power 41, through the coupler 38 and the pumping energy propagates counter-current to the laser signal.

Part of the residual pump power not used in the amplifying section of the signal power (amplifier 3) is fed to the laser 2 through the wavelength multiplexer couplers 33, 24, thus contributing to the population inversion of the active section of said laser.

Hence, the excess or residual pump power, not absorbed by the fiber 30 is deviated from the signal path (line 4) by the coupler 33 and is fed back to laser 2 or 51 through the coupler 24.

This solution allows an optimized use of the pump power and a maximization of the total conversion efficiency (pump power with respect to modulated signal power at 1531 nm).

The pump energy by-pass solution may be used even if the pump laser 17 is a high power source and the length of the active fiber 12 is so small that very little pumping power is absorbed therein.

In this case, almost the whole pump power reaches the coupler 24 and is transmitted to the active fiber 30 of the amplifier 3 through the coupler 33.

For some applications, for instance cable television (CATV) and the like, it is particularly important that the laser 2 operation is very steady and without mode jumps.

To this end it is convenient to make use of a cavity-laser of small dimensions, that is to use an active fiber as short as possible, and make the laser 2 operate at rather low signal emission optical power levels, approximately less than 3 mW (5 dBm), and preferably less than 1.5 mW, with the aim to favor single-longitudinal mode (monomode) operation, in which only one frequency is emitted.

In such a case, adopting standard reflectivity values for the selective reflector 27 of $0.4<Rgr<0.6$ where Rgr is defined as the ratio between reflected optical power and incident optical power, the total pump power absorbed by the fiber laser preferably does not exceed 15 mW and is advantageously less than 10 mW.

The laser suited to operate in the aforesaid conditions makes use of an active fiber of limited length, of the order of some dozen centimeters, preferably doped with alumina and with a very high erbium content, of the order of 1000 ppm. Therefore, the pump power values supplied to the laser section and to the amplifier will be selected to provide the desired performance.

In the case in which, instead, a high amplification efficiency is desired, for example, for digital transmissions, it is preferable to obtain in the laser a high enough output power, making use of a fiber of substantial length and of high supply of pumping power, as indicated in the example of FIG. 3.

In the case in which active fibers with high numerical aperture (for instance $Na>0.3$) are used, these would be obtained, both in the laser section and in the amplification section, a high conversion efficiency, near to theoretical values ($Pu/Pp=0.48$, where Pu is the output signal power, at 1531 nm, and $P_p$ is the pump power, at 980 nm), and hence, it is possible to make use of pump laser whose power is less than the 80 mW used in the system described in the example, (for instance 60 or 40 mW), together with active fibers of less length and/or with different erbium content.

The designing of the laser section and of the amplification section in terms of length and kind of active fiber, based on the specific requirements of each application of the optical generator according to the invention, will be made empirically by the technician on the basis of knowledge in the field.

Preferably the reflectivity value of the width modulator 6 is less than −40 dB in order to avoid, in the amplifier section, the manifestation of spurious oscillations, interferometric noise or amplification efficiency reduction due to exhaustion of the inversion.

It must be noted that the operating wavelength of the system is defined by the reflection features of the selective reflector used. Therefore, this is conveniently chosen so that the reflected wavelength correspond to an emission peak of the used fiber, or anyway to an emission spectrum region at high emission and amplification efficiency.

For instance, in the case of fibers doped with alumina, as in the example described, it is convenient to make use of a selective reflector at a wavelength of about 1531 nm, corresponding to the emission peak of the fiber doped with erbium and alumina.

Dichroic couplers 24, 33 preferably have a selectivity value greater than 20 dB (at each wavelength, the power addressed toward the "wrong" output must be 1% less than the power directed toward the "right" output), with the object of avoiding that spontaneous amplifier emission may arise in the laser, thus compromising the regular operation, or that a fraction of the signal emitted by the laser, and not modulated, may enter the amplifier, thus constituting a noise.

We claim:

1. An optical signal generator comprising:

a continuous wave coherent optical signal source and an optical amplifier operatively connected to said source for amplifying optical signals received by said optical amplifier from said source;

said source comprising an optical fiber laser oscillator including a first active optical fiber having a core doped with a fluorescent substance, said fluorescent substance having laser emission at an emission wavelength and light absorption at a pumping wavelength different from said emission wavelength;

said optical amplifier comprising a second active optical fiber having a core doped with a fluorescent substance having laser emission at said emission wavelength and light absorption at said pumping wavelength;

a source of pumping optical power at said pumping wavelength operatively connected to at least one of said first and said second active optical fibers for supplying pumping optical power to said at least one of said first and second active fibers; and selective transfer means for said pumping optical power, said transfer means being operatively connected to said first and said second active optical fibers to transfer non-absorbed optical power at said pumping wavelength from one of said first and second active optical fibers to the other of said first and second active optical fibers.

2. An optical signal generator according to claim 1 wherein said transfer means comprises:

a first and a second selective dichroic coupler, each coupler having three optical input/output branches, a first one of said branches of said first coupler being operatively connected to an end of said first active optical fiber for conveying signals at said emission wavelength and at said pumping wavelength, and a first one of said branches of said second couplers being operatively connected to an end of the second active optical fiber for conveying signals at said emission wavelength and at said pumping wavelength, a second one of said branches of said first coupler being operatively connected to a second one of said branches of said second coupler for conveying signals at said emission wavelength from said first coupler to said second coupler, and a third one of said branches of said first coupler, being operatively connected to a third one of said branches of said second coupler by optical conduction means for conveying luminous emission at said pumping wavelength between said laser oscillator and said optical amplifier.

3. The optical signal generator according to claim 1, wherein said optical power supply means is connected to said first active optical fiber.

4. The optical signal generator according to claim 1, wherein said optical power supply means is connected to said second active optical fiber.

5. The optical signal generator according to claim 1, wherein said source of pumping optical power is connected to said first active optical fiber, and further comprising a second source of pumping optical power connected to said second active optical fiber.

6. The optical signal generator according to claim 1, wherein said source of pumping optical power is connected to the end of said second active optical fiber farthest from said continuous wave coherent optical signal source.

7. The optical signal generator according to claim 1, wherein said core of said first active optical fiber and said core of said second active optical fiber are doped with at least one fluorescent substance which is the same for both said core of said first optical fiber and said core of said second optical fiber.

8. The optical signal generator according to claim 7, wherein said at least one fluorescent substance is erbium.

9. The optical signal generator according to claim 1, wherein said core of said first active optical fiber and said core of said second active optical fiber are doped with alumina as a refraction index modifier.

10. The optical signal generator according to claim 2, further comprising a width modulation means interposed between said continuous wave coherent optical signal source and said optical amplifier for modulating said optical signals at said emission wavelength received by said optical amplifier from said continuous wave coherent optical signal source.

11. The optical signal generator according to claim 10, further comprising an optical isolator interposed between said continuous wave coherent optical signal source and said width modulation means for allowing light propagation substantially only in one direction from said continuous wave coherent optical signal source to said optical amplifier.

12. The optical signal generator according to claim 1, wherein said optical amplifier has an output for providing amplifier optical signals and further comprising an optical isolator connected to said output for allowing light propagation substantially only in the direction away from said output.

13. The optical signal generator according to claim 8, wherein said emission wavelength is within a band between 1530 and 1550 nm.

14. The optical signal generator according to claim 8, wherein said pumping wavelength is 980 nm.

* * * * *